(12) United States Patent
Wieczorek et al.

(10) Patent No.: US 7,967,328 B2
(45) Date of Patent: Jun. 28, 2011

(54) CONTINUOUS SIDE AIRBAG SEAM

(75) Inventors: Joseph P. Wieczorek, Lake Orion, MI (US); Timothy Owen Hamlin, Warren, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 70 days.

(21) Appl. No.: 12/154,108

(22) Filed: May 20, 2008

(65) Prior Publication Data

US 2008/0290635 A1 Nov. 27, 2008

Related U.S. Application Data

(60) Provisional application No. 60/931,964, filed on May 24, 2007.

(51) Int. Cl.
*B60R 21/16* (2006.01)

(52) U.S. Cl. .............. 280/728.3; 280/730.2; 297/216.13

(58) Field of Classification Search .............. 280/730.2, 280/728.3, 728.2; 297/216.1, 216.13, 216.14
See application file for complete search history.

(56) References Cited

U.S. PATENT DOCUMENTS

| | | | |
|---|---|---|---|
| 5,492,073 A | 2/1996 | Abraham | |
| 5,511,821 A | 4/1996 | Meyer et al. | |
| 5,762,363 A | 6/1998 | Brown et al. | |
| 5,788,272 A * | 8/1998 | Yanase ...................... | 280/730.2 |
| 5,810,389 A * | 9/1998 | Yamaji et al. .............. | 280/730.2 |
| 5,816,610 A | 10/1998 | Higashiura et al. | |
| 5,816,660 A | 10/1998 | Johnson, III | |
| 5,826,938 A | 10/1998 | Yanase et al. | |
| 5,829,779 A | 11/1998 | Nakashima et al. | |
| 5,829,827 A | 11/1998 | Schaper et al. | |
| 5,845,966 A | 12/1998 | Severinski et al. | |
| 5,927,749 A | 7/1999 | Homier et al. | |
| 5,951,039 A | 9/1999 | Severinski et al. | |
| 5,967,546 A | 10/1999 | Homier et al. | |
| 5,967,603 A | 10/1999 | Genders et al. | |
| 5,975,567 A | 11/1999 | Higashiura | |
| 5,997,032 A | 12/1999 | Miwa et al. | |
| 6,029,993 A | 2/2000 | Mueller | |
| 6,045,151 A | 4/2000 | Wu | |
| 6,074,003 A | 6/2000 | Umezawa et al. | |
| 6,095,602 A | 8/2000 | Umezawa et al. | |
| 6,151,926 A | 11/2000 | Leeke et al. | |
| 6,206,410 B1 | 3/2001 | Brown | |
| 6,213,498 B1 | 4/2001 | Ghalambor et al. | |
| 6,237,934 B1 | 5/2001 | Harrell et al. | |
| 6,254,122 B1 | 7/2001 | Wu et al. | |
| 6,296,802 B1 | 10/2001 | Blazaitis et al. | |
| 6,409,210 B1 | 6/2002 | Emerling | |
| 6,439,597 B1 * | 8/2002 | Harada et al. .............. | 280/728.2 |

(Continued)

*Primary Examiner* — Eric Culbreth
(74) *Attorney, Agent, or Firm* — Raggio & Dinnin, P.C.

(57) ABSTRACT

A continuous side airbag seam for use in a seat of a motor vehicle is disclosed. The seam includes a first material and a second material or a combination of materials joined to one another. The seam further may include any known thread member used to join the first material to the second material. The seam will extend from a portion near the top of the side panel of the seat cover to a portion near the back of the side panel of the seat cover. The seam will be continuous from the top portion to the back portion of the side panel cover of the seat. The continuous seam will have a predetermined shaped curve therein. The predetermined shaped curve will allow for quicker deployment of both the thorax section and pelvis section of an advanced two part side airbag to deploy both downward and forward in a controlled manner.

17 Claims, 1 Drawing Sheet

U.S. PATENT DOCUMENTS

| | | |
|---|---|---|
| 6,443,525 B1 | 9/2002 | Haupt |
| 6,568,707 B2 | 5/2003 | Hier et al. |
| 6,630,220 B1 | 10/2003 | Veiga |
| 6,688,640 B1 | 2/2004 | Davis, Jr. et al. |
| 6,848,707 B2 | 2/2005 | Bauer et al. |
| 6,851,704 B2 | 2/2005 | Davis, Jr. et al. |
| 6,886,479 B1 | 5/2005 | Hori |
| 6,886,858 B2 | 5/2005 | Olson |
| 6,926,792 B1 | 8/2005 | Valkenburg et al. |
| 7,100,992 B2 * | 9/2006 | Bargheer et al. ............ 280/730.2 |
| 7,178,826 B2 * | 2/2007 | Acker et al. ................ 280/730.2 |
| 2002/0130537 A1 | 9/2002 | Lotspih |
| 2004/0227335 A1 | 11/2004 | Acker et al. |
| 2005/0156412 A1 | 7/2005 | Panagos et al. |
| 2005/0258624 A1 | 11/2005 | Abraham et al. |
| 2009/0315305 A1 * | 12/2009 | Evans et al. ................. 280/730.2 |
| 2009/0315373 A1 * | 12/2009 | Thomas et al. ........... 297/216.13 |

* cited by examiner

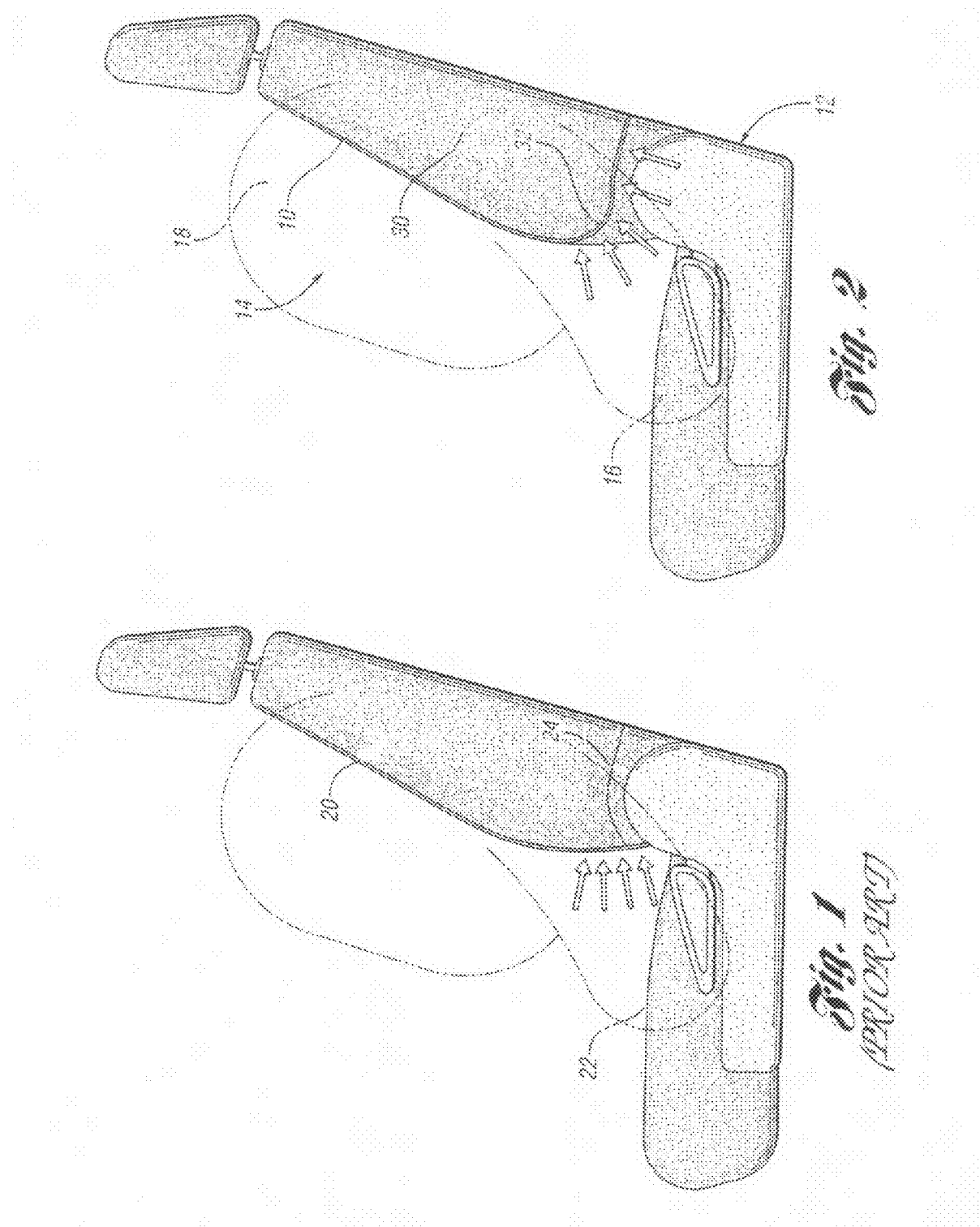

CONTINUOUS SIDE AIRBAG SEAM

This application claims the benefit of provisional application 60/931,964 filed May 24, 2007.

TECHNICAL FIELD

The present invention generally relates to a seam for connecting two pieces of material, and more particularly relates to a continuous side airbag seam for use in automotive upholstery material covering a seat having an airbag therein.

BACKGROUND OF THE INVENTION

It is well known in the prior art of automotive vehicles to provide an airbag assembly for protection of a vehicle occupant. These prior art airbag assemblies typically are deployed from in front of a person or from a seat or roof line of an automotive vehicle. The airbags generally include an inflatable cushion structure in communication with a gas emitting inflator. When predetermined vehicle conditions occur an airbag cushion is deployed outwardly from its stored position in the dashboard, roof, seat or other component within a vehicle interior into a position between the occupant and the interior portions of a vehicle against which the occupant might otherwise come in contact with. The use of the airbag cushion between the occupant and interior portions of the vehicle may provide a cushioning effect for the occupant against hard impacts with the interior portions of the vehicle during an accident situation.

Many prior art airbag systems for use in motor vehicles may have an airbag arranged within a seat. These types of airbags generally deploy through a molded plastic cover or a sewn seam in a cover material of the seat. Many of these prior art seat airbags penetrate the seat cover by tearing open a sewn seam in the seat cover. However, there have been deficiencies in the prior art with such systems, i.e., ballooning of the seat cover may sometimes occur prior to failure of the seam, which may increase the amount of time required for the airbag to exit the seat and could result in delayed positioning of the airbag with relation to the occupant during a crash event. Furthermore, there also have been problems with the prior art seat airbags in that the more sophisticated and two piece side airbags that deploy a thorax portion of the airbag and a pelvis portion of the airbag are not deploying quick enough to provide proper protection to the pelvis and thorax of a user of these prior art airbag systems in the automotive vehicle during a crash situation. However, many of these prior art seat airbag side impact assemblies have generally been useful in protection of occupants and especially provide useful protection against head and torso injuries.

Therefore, there is a need in the art for an improved seat side airbag seam that tears more quickly and easily and has a more consistent and complete tear along the seam. There is a need in the art for a seam that will allow an airbag having a thorax section and a pelvis section to fully deploy in the least amount of time possible to provide proper protection between the body of the user of the vehicle and the vehicle during a crash situation. There also is a need in the art for an improved design of the seam to which the side airbag deploys such as using a continuous seam from the top of the side panel through a curved portion to a back portion of the side panel of the seat.

SUMMARY OF THE INVENTION

One object of the present invention may be to provide an improved seat seam for side airbag deployment.

Another object of the present invention may be to provide a seam in a vehicle seat that will allow for quicker and easier deployment of an airbag through a seat cover.

Still another object of the present invention may be to provide a seam in a seat for deployment of a side airbag that will allow a pelvis section of a side airbag to deploy both downward and forward in a controlled manner.

Still another object of the present invention may be to provide a tunable seam to allow for airbag deployment times to be reduced to approximately 10 milliseconds from a vehicle seat.

Still another object of the present invention may be to provide a better way to control the deployment process of a two part airbag having a thorax section and a pelvis section.

To achieve the foregoing objects, a continuous side airbag seam for use in a seat of a motor vehicle is disclosed. The seam will include a first material and a second material or a combination of materials joined to one another. The seam further may include any known thread member used to join the first material to the second material. The seam will extend from a portion near the top of the side panel of the seat cover to a portion near the back of the side panel of the seat cover. The seam will be continuous from the top portion to the back portion of the side panel cover of the seat. The continuous seam will have a predetermined shaped curve therein. The predetermined shaped curve will allow for quicker deployment of both the thorax section and pelvis section of an advanced two part side airbag to deploy both downward and forward in a controlled manner.

One advantage of the present invention may be that it provides a novel and improved seam for use in the seat of a vehicle having a side airbag.

Still a further advantage of the present invention may be that it allows for quicker and easier tearing of the seam in the seat to allow for quicker deployment of a two part airbag from the seat.

Still another advantage of the present invention may be that it provides a more consistent tear along the seam that requires less force to produce the tear along the seam of the seat, thus decreasing the deployment time of the airbag into a proper position.

Still a further advantage of the present invention may be that a continuous seam may have a predetermined curve to allow for controlled deployment of a two piece airbag from a vehicle seat.

Yet another advantage of the present invention may be that it provides for a seat side airbag seam and seat cover that is easier to manufacture.

Yet another advantage of the present invention may be that it provides for a reduced deployment time of a two part airbag compared to prior art airbags.

Other objects, features and advantages of the present invention will become apparent from the subsequent description, taken in conjunction with the accompanying drawings.

BRIEF DESCRIPTION OF THE DRAWINGS

FIG. 1 shows a prior art side airbag seam for use on a vehicle seat.

FIG. 2 shows a continuous side airbag seam for use in a vehicle seat according to the present invention.

DESCRIPTION OF THE EMBODIMENT(S)

Referring to the drawings, a seam 10 for use in a seat 12 of a vehicle having an airbag 14 arranged therein is disclosed. It should be noted that the upholstery seam 10 shown in the drawings is for use on a seat 12 having a side airbag 14 deployed therefrom. The seam 10 may be used with any type of material, such as laminate back material, non laminate backed material, or any other known covering material that is used to cover a seat, such as leather, cloth, vinyl, imitation leather, or any other known material used for vehicle seats. The seat cover may include a front panel, a back panel and side panels for both the horizontal seating section and vertical seat back section. The use of the seam 10 according to the present invention may allow for reduced deployment times and quicker and more complete tearing of the seam 10 during deployment of the airbag 14 in a crash situation. Generally, the seam 10 according to the present invention will be located directly adjacent to the airbag 14 stored within the seat 12 and the portion of the seam 10 through which the airbag is to be deployed between the occupant and the interior surfaces of the vehicle. The airbag 14 may be guided during deployment by a chute that is connected to a first and second material or cover of the seat 12 at the seam 10. An airbag inflator upon signal from a vehicle computer may release a hot gas to inflate the airbag 14 and expel the airbag 14 from the seat 12 through the seam 10 into proper position between the occupant in the vehicle and the interior surfaces of the vehicle. The seam 10 of the present invention will allow for better control of the deployment process of a multipiece airbag 14 via more consistent tearing of the seam and a quicker tearing of the seam along the entire continuous seam 10. The seam 10 of the present invention will allow the airbag 14 to more quickly be placed in its proper position between the occupant in the vehicle and the interior surfaces of the vehicle. It should be noted that the present invention may have a tunable tear seam 10 that is capable of being tuned to specific tear parameters by adjusting the material and the thread used to create the seam 10, such as but not limited to monofilament thread and the thickness of such thread. The use of the seam 10 according to the present invention will allow for a two section airbag 14 having a pelvis section 16 and a thorax section 18 to deploy both outward and forward in a controlled manner to allow for proper full deployment of the airbag 14 during a crash situation.

FIG. 1 shows a prior art standard side airbag seam 20 that generally may impede the deployment of a pelvis section 22 of a two part airbag known in modern automotive vehicles. Generally, the standard side airbag seam 20 extends from a top portion of the side cover to a bottom portion of the side cover and then a second seam 24 extends from the end of the bottom portion of the side panel to a back portion of the side panel of the seat. This standard side airbag seam 20 may impede the deployment of the lower or pelvis section 22 of the two part airbag. Such deployment would either take many seconds or would not completely deploy thus not providing proper protection between the occupant and the interior surfaces of the vehicle. Generally, the prior art tear would have to travel down the entire length of the front surface of the side surface of the seat and then up the second seam 24 toward the back surface of the side surface of the seat. This may take many milliseconds and delay the proper deployment of the side airbag.

As shown in FIG. 2 the present invention of a continuous side airbag seam 10 for use on an automotive seat 12 is disclosed. The present invention uses a continuous seam 10 that extends from or near a top portion of the side panel 30 of the seat 12 to a lower back portion of the side panel 30 of the seat 12 in one continuous seam and/or path 10. Therefore, the airbag 14 may deploy from one continuous seam or path 10. The prior art deployment methods have a first seam 20 tear and then have a second seam 24 that is traveling up in an opposite direction tear to allow for proper deployment of a pelvis section 22 of the two part airbag. With the present invention the continuous seam 10 may tear quicker, more completely and more efficiently in one unified tearing motion along the seam 10. This complete tearing of the continuous seam 10 may allow for complete and full deployment of both sections, i.e., a pelvis 16 and thorax section 18 of the airbag 14 between the vehicle interior surfaces and the occupant of the seat 12. It should be noted that the continuous side airbag seam 10 of the present invention may be made by any known seam connection method and any known thread member such as any known natural thread, monofilament thread, or any other combination of thread to connect a first and second material along one edge to one another. Any type of thread member may allow for the continuous side airbag seam 10 of the present invention to deploy the two section airbag 14 in the least amount of time possible. In one contemplated embodiment it is contemplated that the two section airbag 14 may fully deploy both the pelvis section 16 and the thorax section 18 within the range of one millisecond to thirty milliseconds. In one contemplated embodiment the airbag completely deploys both sections within approximately ten milliseconds.

It should be noted that the continuous side airbag seam 10 has a predetermined shaped curve 32 portion that transitions from the front portion of the side panel 30 to the back portion of the side panel 30 of the automotive vehicle seat. The curve 32 may have any defined radius, generally round or circular like shape. The continuous seam 10 may have any shaped curve that will allow for quicker and easier tearing of the continuous side airbag seam 10 in comparison to those of the prior art that had a first seam that would have to tear and then a second seam that would tear in an upward direction on the side seat panel, thus delaying and impeding deployment of the pelvis section of a two part airbag. Any of the known seam connecting methodologies may be used for the continuous side airbag seam 10 of the present invention including but not limited to a monofilament seam as previously filed in an application by the Applicant. Applicant's previously filed applications for a French seam and any other known seam or fastening method is capable of fastening multiple or two pieces of material to one another. It should also be noted that the seat 12 may be made of any known material such as leather, imitation leather, any known fabric or the like. It should be noted that as shown in FIG. 2 auxiliary seams for fastening other portions of the side panel covering of the seat 12 may extend from or next to the continuous side airbag seam 10 of the present invention. However, these other seams generally may not tear during deployment of the side airbag 14. The continuous side airbag seam 10 of the present invention is designed to tear in a quick and efficient manner to allow for complete deployment of a two portion airbag 14 having both a pelvis section and a thorax section. It should be noted that the continuous side airbag seam 10 of the present invention can be used with any other safety device such as front airbags, roof airbags, and any other known safety features used in modern day automobiles.

The present invention has been described in an illustrative manner. It is to be understood that the terminology which has been used is intended to be in the nature of words of description rather than of limitation.

Many modifications and variations of the present invention are possible in light of the above teachings.

What is claimed is:

1. A seam for use in a seat of a vehicle having a cover with a side panel and an airbag deploying through the seam in crash situations, said seam including:

a thread; and a continuous path from a top front edge of the side panel of the seat to a lower back edge of the side panel of the seat, said path following an outer contour of a front and bottom edge of a first section of the side panel.

2. The seam of claim 1 wherein the airbag deploys from said seat in approximately six to twelve milliseconds.

3. The seam of claim 2 wherein the airbag deploys in approximately ten milliseconds.

4. The seam of claim 1 wherein said path having a predetermined shaped curve portion, said curve providing a transition from a front of said side panel to a back of said side panel.

5. A seam for use in a seat of a vehicle having a cover with a side panel and an airbag deploying through the seam in crash situations, said seam including:

a monofilament thread; and a continuous path from a top front edge of the side panel of the seat to a lower back edge of the side panel of the seat, said path following an outer contour of a front and bottom edge of a first section of the side panel.

6. A seat for use in an automotive vehicle having crash protection arranged therein, said seat including:

an airbag arranged within the seat;

a seat cover having a side panel; and a continuous seam arranged between a top front edge of said side panel and a lower back edge of said side panel, said seam is arranged along an outer contour of a front and bottom edge of a first section of said side panel, said continuous seam provides for a unified tearing motion of said seat cover.

7. The seat of claim 6 wherein said continuous seam is arranged adjacent to said airbag.

8. The seat of claim 6 wherein said airbag is a two part airbag.

9. The seat of claim 8 wherein said airbag having a pelvis section and a thorax section.

10. The seat of claim 6 wherein said airbag deploys from the seat in approximately six to twelve milliseconds.

11. The seat of claim 10 wherein said airbag fully deploys in approximately ten milliseconds.

12. The seat of claim 6 wherein said continuous seam having a predetermined shaped curve portion therein.

13. The seat of claim 12 wherein said curved portion provides a transition from a front portion of said side panel to a lower back portion of said side panel.

14. A seat for use in an automotive vehicle having crash protection arranged therein, said seat including:

an airbag arranged within the seat;

a seat cover having a side panel; and a continuous seam arranged between a top front edge of said side panel and a lower back edge of said side panel, said seam arranged along an outer contour of a front and bottom edge of a first section of said side panel, said continuous seam is made with a monofilament thread.

15. A seat for use in an automotive vehicle having crash protection arranged therein, said seat including:

an airbag arranged within the seat;

a seat cover having a side panel; and a continuous seam arranged between a top front edge of said side panel and a lower back edge of said side panel, said seam arranged along an outer contour of a front and bottom edge of a first section of said side panel, said continuous seam is made with a thread.

16. A method of deploying an airbag from a seat in a vehicle during a crash situation, said method including the steps of:

sewing a seat cover with a continuous seam that extends from a top edge of a first section of a side panel of said seat cover to a lower back edge of said first section of said side panel of said seat cover;

arranging an airbag within the seat adjacent to said continuous seam; and tearing said continuous seam in a unified motion to allow said airbag to have a predetermined deployment time in the crash situation.

17. The method of claim 16 wherein predetermined deployment time is approximately ten milliseconds or less.

* * * * *